March 30, 1965 N. A. BOLTON 3,176,267
VEHICLE REGISTERING SYSTEM
Filed June 8, 1961 4 Sheets-Sheet 1
FIG. IA.
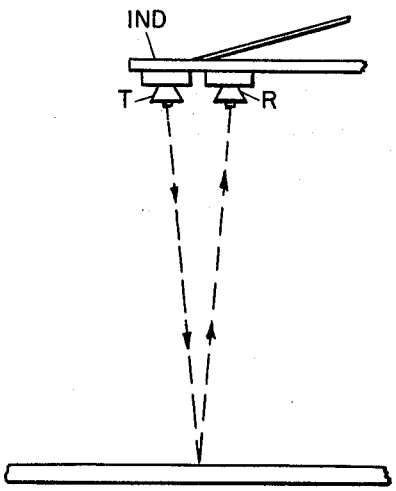
FIG. IB.
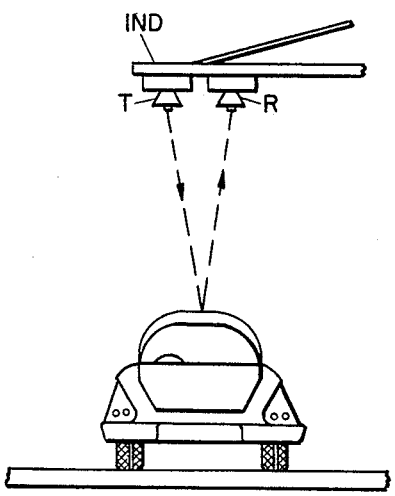
FIG. 2.
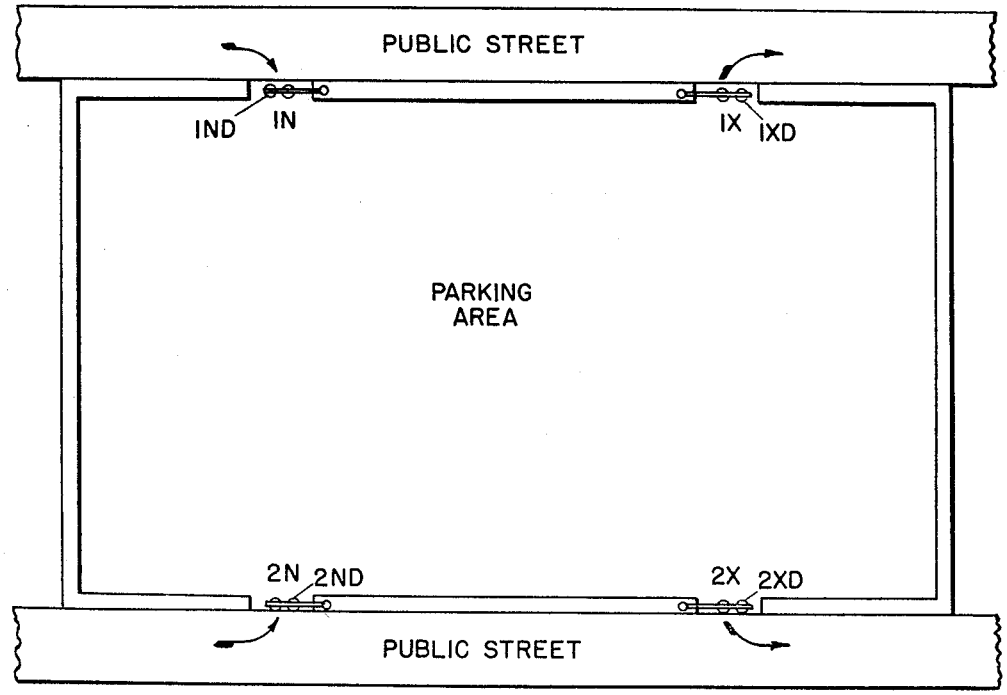
INVENTOR.
N. A. BOLTON
BY
HIS ATTORNEY March 30, 1965 N. A. BOLTON 3,176,267
VEHICLE REGISTERING SYSTEM
Filed June 8, 1961 4 Sheets-Sheet 2

INVENTOR.
N. A. BOLTON
BY
HIS ATTORNEY

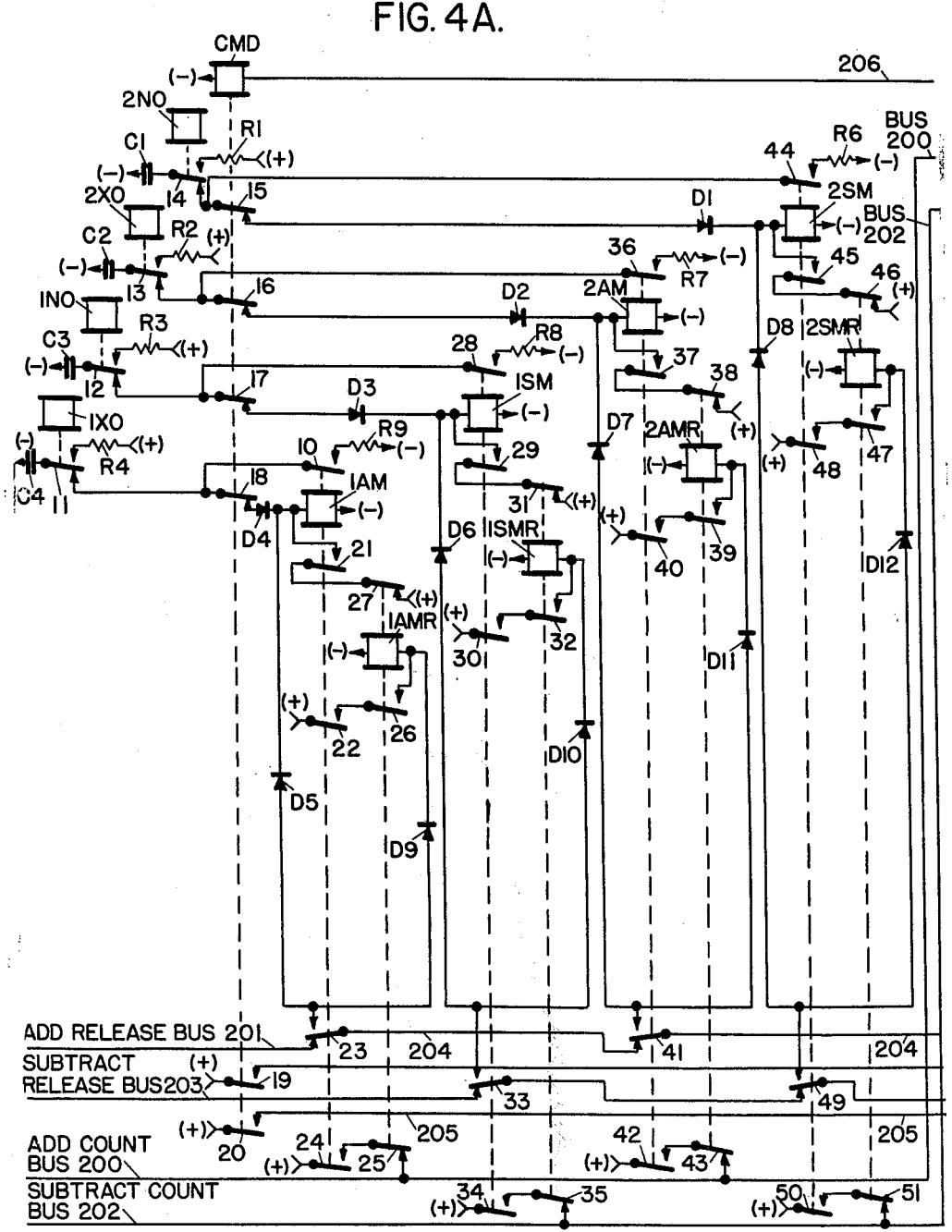

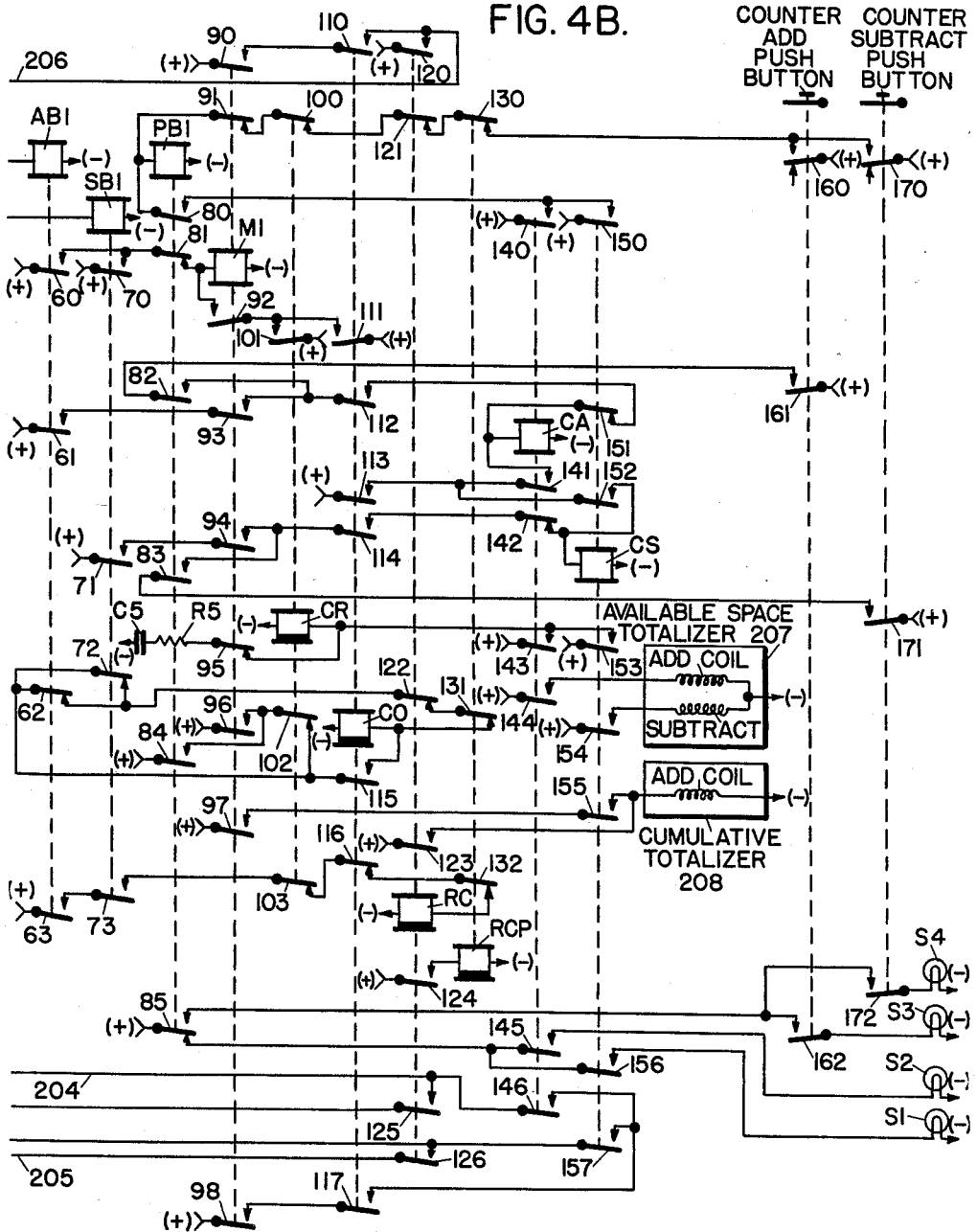

United States Patent Office 3,176,267
Patented Mar. 30, 1965

3,176,267
VEHICLE REGISTERING SYSTEM
Norman A. Bolton, Scottsville, N.Y., assignor to General
Signal Corporation, a corporation of New York
Filed June 8, 1961, Ser. No. 115,790
6 Claims. (Cl. 340—51)

This invention relates to the selective detection and counting of vehicles in accordance with their direction of travel through predetermined detection areas; and, more particularly pertains to a system wherein the operation of a totalizer of vehicle counts is avoided upon the simultaneous occurrence of mutually cancelling conditions. This applicaton is a continuation-in-part of my earlier co-pending application Ser. No. 82,903, filed January 16, 1961, and my application Serial No. 841,389, filed September 21, 1959, now Patent No. 3,079,077, issued February 26, 1963.

A system for the selective detection and counting of vehicles in accordance with their direction of travel through predetermined detection areas has many applications in the field of traffic management and control. Such systems are frequently used for counting vehicles entering or leaving a parking area so that an instantaneous count is at all times maintained of the number of parking spaces available in the parking area and/or for the purpose of ascertaining the receipts derived from operation of the parking area. It can therefore be seen that the accuracy and the rate at which the vehicle registering system is capable of counting vehicles plays an important part in the planning and operation of such a parking area.

In general, the present invention provides a vehicle registering system which is capable of detecting and rapidly counting vehicles into and out of a parking area. The vehicle counts successively actuate and add/subtract impulse counter provided with display means for indicating the number of spaces available in the parking area at a given time; which will hereinafter be referred to as the "available space totalizer." The vehicle counts representing entering vehicles are also used to operate an impulse counter for indicating the total number of vehicles which entered the parking area during a given time period. This counter which will hereinafter be referred to as the "cumulative totalizer."

One of the limiting factors affecting the accuracy and the rate at which a vehicle registering system can count is the time required by the internal mechanism of the available space totalizer to register a given vehicle count on its display means and again be prepared to accept a new vehicle count. This factor becomes particularly important whenever it is required that the system count a large number of vehicles entering and leaving the parking area at substantially the same time.

When contemporaneous vehicle passages occur in opposite directions, the entering vehicle will cause an available space totalizer operation to subtract one unit from a total appearing on its display means, and the exiting vehicle will cause a totalizer operation to add one unit to the total appearing on the totalizer display means. Such totalizer operations do not affect the overall count, and they are time consuming. Since one prime consideration with respect to a vehicle registering system's ability to count without error is whether the operating time of the available space totalizer is such that all vehicles entering or leaving the parking area can be registered, elimination of these unnecessary totalizer operations would insured a more accurate and faster vehicle registering system. The present invention reliably provides means for eliminating these totalizer operations which are representative of contemporaneous vehicle passages in opposite directions.

Another problem which affects the accuracy of the available parking space count displayed on the totalizer occurs whenever the operator of the parking area may not be able to fill the parking area to capacity. For example, maintenance work in a certain part of the parking area may prohibit the use of a number of parking spaces. When a situation such as this occurs, the number of available parking spaces appearing on the available space totalizer display means would be accurate with respect to traffic movements into and out of the parking area but would not reflect the number of parking spaces now unavailable as a consequence of the maintenance work. Under these circumstances, the operator of the parking area might permit a number of vehicles to enter an area which is already filled to capacity.

In order to overcome the problem the present invention provides means for manually operating the counting circuits of the vehicle registering system to alter the instantaneous count of available spaces displayed on the totalizer. Vehicle counts are successively added to or subtracted from the instantaneous count appearing on said totalizer for as long as a pushbutton is actuated, and said alterations occur at a rate slower than the normal operating time of the counting circuits in order to be readily discernible by the operator.

Manual initiation of the counting circuits of the vehicle registering system will not interfere with the detection and automatic registration of vehicles entering or leaving the parking area during the time that the operation of the available space totalizer is being manually operated.

Another factor affecting the accuracy of a vehicle registering system occurs whenever a plurality of vehicles enter or leave the parking area at approximately the same time. As the customary totalizer operates only one count at a time, it is necessary to produce successive operations of the totalizer, one for each vehicle count to be registered. Therefore when a plurality of similar vehicle counts are to be registered at approximately the same time, it is necessary that the vehicle count representing each similar vehicle movement be stored and released only when the totalizer registers the passage of that vehicle.

When a stored vehicle count is released as a result of an operation of the totalizer, care must be taken that such releasing operation does not also remove from the vehicle count storage means a vehicle count representative of a just-detected vehicle whose count is at that instant applied to the storage means for storage therein. One feature of the present invention is the provision of improved apparatus for accomplishing this result.

In view of the above and other considerations, one object of the present invention is to provide a vehicle registering system capable of selectively detecting and reliably counting rapidly vehicles entering and leaving a parking area over a roadway.

Another object of the present invention is to provide a vehicle registering system with means for eliminating those unnecessary operations of the counting circuits which are representative of a first vehicle entering and a second vehicle leaving the parking area at approximately the same time.

It is a further object of the present invention to provide a circuit organization for manually operating of the counting circuits of the vehicle registering system in such manner that said operation will not interfere with the automatic detection and registration of vehicles entering or leaving the parking area while said counting circuits are being manually initiated.

Still another object of the present invention is to provide a vehicle registering system with means for insuring the successive registration of each vehicle when a plurality of vehicles are entering or leaving the parking area at approximately the same time.

Other objects, purposes and characteristic features of this invention will in part be obvious from the drawings and in part pointed out as the description of the invention progresses.

To simplify the illustration and facilitate the explanation of this invention, the various parts and circuits constituting this embodiment have been shown diagrammatically so as to make it easy to understand the principles and mode of operation rather than to illustrate the specific construction and arrangement of parts that would be employed in practice. The various relays and their contacts are illustrated in a conventional manner, and the symbols (+) and (—) are used to indicate connections to the terminals of batteries and other suitable sources of electrical current instead of showing all the wiring connections to these terminals.

In describing the invention in detail, reference will be made to the accompanying drawings in which like reference characters designate corresponding parts in the several views and in which:

FIGS. 1A and 1B illustrate one possible arrangement of the receiving and transmitting transducers in relation to the vehicles to be detected that may be employed when practicing the present embodiment of this invention;

FIG. 2 illustrates a simplified layout of a parking area suitable for use with the present invention having passageways for entering and exiting vehicles on two perimeters of the parking area with each passageway being monitored by the detection apparatus shown in FIGS. 1A and 1B;

FIGS. 4A and 4B illustrate the counting circuits of this invention.

FIGS. 1A, 1B and 2 illustrate how the invention may be used to count vehicles passing over single lane roadways leading into and out of a parking area.

FIGS. 1A and 1B illustrate one manner in which the transducers may be mounted when pulsed ultrasonic vehicle detectors are employed. A transducer unit IND comprising both a transmitting transducer T and a receiving transducer R is positioned substantially over the center of the roadway leading into or out of the parking area.

Figure 3:
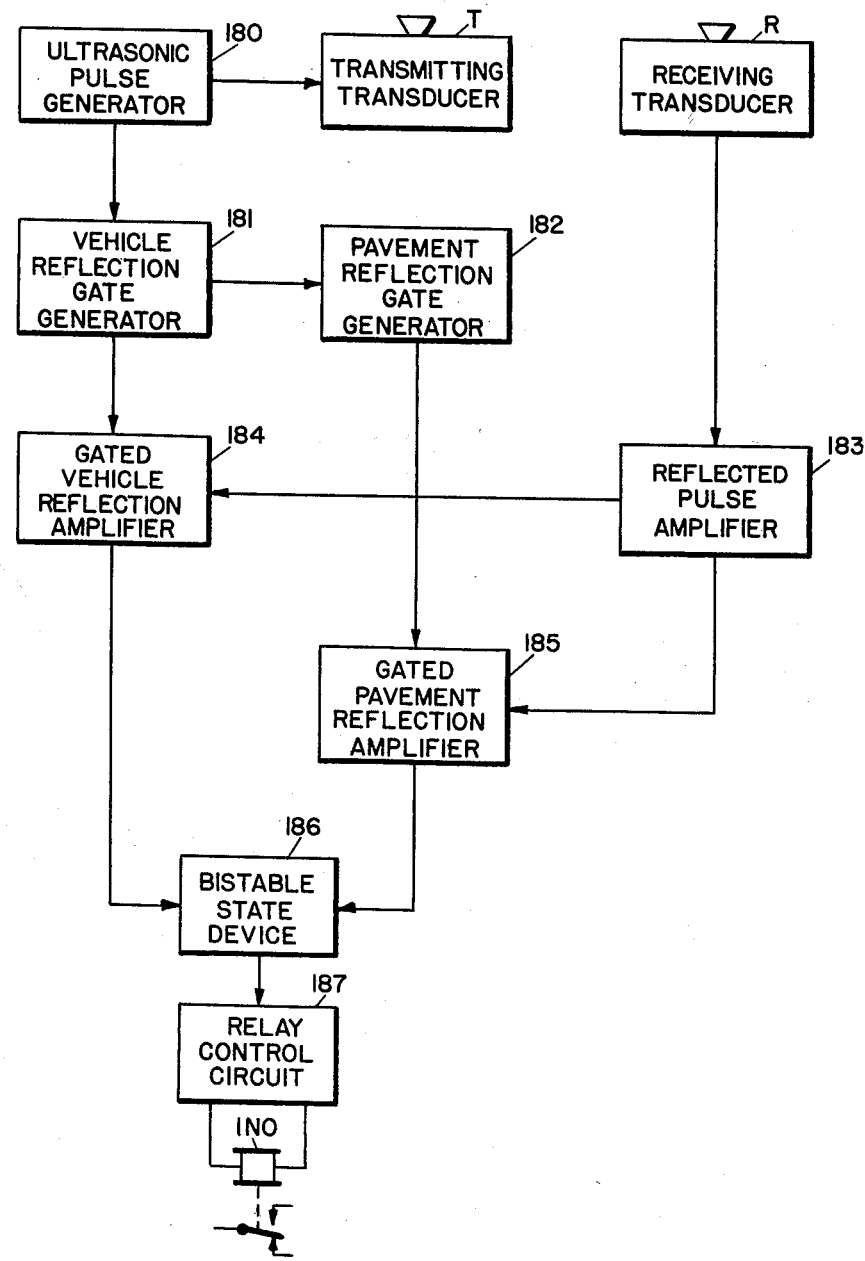
FIG. 3 is a block diagram of the circuit organization of the vehicle detector apparatus.

FIG. 2 shows in simplified diagrammatic form the general layout for one type of parking area with which this invention may be suitably employed. It is to be understood, however, that this particular layout has been chosen to facilitate the disclosure of the present invention and this invention may be used with a parking area having more or less passageways than shown in FIG. 2 or the passageways shown may be multiple lane roadways with traffic passing thereover in the same or opposite directions.

Various types of vehicle presence detectors may be employed to fulfill the requirements of the present invention; thus a photocell detector may be used, or, alternately, one which employs an antenna energized with high frequency radiation and is "loaded" by the presence of a nearby vehicle.

Preferably, however, it is contemplated that ultrasonic detectors, responsive to vehicles but not to people, be employed. One such detector is shown in the Kendall et al. Patent No. 3,042,303, issued July 3, 1962. Another such ultrasonic detector is shown in the Auer Patent No. 3,045,909, issued July 24, 1962, which has been briefly illustrated in FIG. 3 by a block diagram to diagrammatically indicate its broad functions. Both of the above mentioned co-pending applications are assigned to the assignee of the present invention.

The vehicle detector apparatus there disclosed not only makes use of the vehicle reflections that are received whenever a vehicle is within the sound beam but also makes use of the pavement reflections that occur when no vehicle is present. More specifically, the detection system is so organized that in order for a vehicle to be detected it is required that a prescribed series of events occur; namely, it is first required that the normally received pavement reflection pulses cease and that vehicle reflection pulses instead be received, and secondly, it is necessary that vehicle reflections cease and pavement reflections again be received in order for the apparatus to be restored to the normal condition so that a subsequent vehicle can be detected.

Generally speaking, a pulse generator 180 provides pulses of ultrasonic energy to a transmitting transducer T. Such transducer T causes these pulses to be beamed as indicated in FIGS. 1A and 1B. When ultrasonic pulses of energy strike the ground or pavement or some other reflecting surface, such pulses are reflected back to the receiving transducer R. These reflected pulses are supplied to a reflected pulse amplifier 183 which in turn supplies an output to the gated amplifiers 184 and 185.

A vehicle reflection gate generator 181 is supplied with pulses from the pulse generator 180 and in turn controls the gated amplifier 184 so that it may give an output to the bi-stable state device 186 only if a reflected sonic pulse is received during a particular time interval following a transmitted pulse. In a similar manner the vehicle reflection gate generator 181 supplies energy to the pavement reflection gate generator 182 so that it can in turn control the gated pavement reflection amplifier 185. Such control provides that a reflected sonic pulse can cause the gated amplifier 185 to provide an output only if such reflected pulse is received during a particular time allotted to the pavement reflection gate generator 182 following that time allotted to the vehicle reflection gate generator 181.

In other words, the pulses of ultrasonic energy are transmitted sufficiently spaced to allow for reflections to be received by the transducer R while no energy is being transmitted by the transducer T. If reflected pulse energy is received as reflected from a vehicle then its time of reception after the transmitted pulse is shorter than a pulse reflected from the ground or pavement. Thus, it can be seen that the vehicle reflection gate generator 181 and the pavement reflection gate generator 182 can be adjusted to respectively allow pulses to be passed by the gated vehicle reflection amplifier 184 or the gated pavement reflection amplifier 185 dependent upon whether such pulses are received from a vehicle or the ground.

When ground pulses are successively received the bi-stable state device 186 is operated to a normal condition; but if vehicle reflected pulses are successively received the bi-stable state device 186 is operated to a sound operative condition in which it remains until ground pulses are received. This means that when no vehicle is present within the detection zone the bi-stable state device 186 receives an input pulse from the pavement reflection amplifier 185 for each transmitted sound pulse. As long as it receives such input pulses the bi-stable state device 186 remains in its normal condition and thus is effective to control the relay control circuit 187 so that the roadway occupancy relay 1NO remains in is normal dropped away condition. However, once reflected pulses are received from a vehicle the bi-stable state device 186 can no longer receive input pulses from the pavement reflection amplifier 185. Instead it then receives successive input pulses from the vehicle reflection amplifier 184, and this causes the bi-stable state device 186 to be actuated to its operative condition in which it remains until ground pulses are again received. The bi-stable state device 186 then controls the relay control circuit 187 in such manner that the roadway occupancy relay 1NO is picked up and remains in that condition until the vehicle has departed from the detection area.

It can thus be seen that this type of detection organization is highly useful in connection with a vehicle registration system associated with a parking area for the reason that the relay 1NO of FIG. 3 may be controlled in such manner that it is continuously dropped away during the absence of vehicles and picked up steadily during the passage of a vehicle beneath it. Similar apparatus for the detection of vehicle presence is associated with each roadway of the parking area as shown in FIG. 2 and each such detection apparatus is like that described in connection with FIG. 3.

Referring now to FIGS. 4A and 4B it can be seen that each of the vehicle detectors 1ND, 1XD, 2ND and 2XD respectively control a roadway occupancy relay 1NO, 1XO, 2NO and 2XO in the same manner as hereinbefore described for vehicle detector 1ND and its occupancy relay 1NO. Associated with each passageway occupancy relay is a resistor/capacitor circuit such as C3/R3. The function of this circuit is to store the energy representative of a vehicle count during the time a vehicle is traveling beneath the detector 1ND. When the vehicle passes out of the detection area of the vehicle detector 1ND, occupancy relay 1NO is dropped away causing the energy stored in the capacitor C3 to be released, energizing the subtract memory relay 1SM.

Four count memory relays 1AM, 1SM, 2AM and 2SM, are shown. These relays, broadly speaking, serve as storage means for the vehicle counts until such time as they are registered on the totalizers. Four count memory relays and their associated circuits are shown but more or less may be provided in accordance with the number of passageways and detection areas serving the parking area and they may be cascaded in a manner similar to that illustrated.

A count memory delay relay CMD is provided with back contacts normally connecting each of the aforementioned capacitors with a count memory relay. The relay CMD is energized whenever a vehicle count is being registered on a totalizer and releasing energy is made available to remove that vehicle count from one of the count memory relays. In this way, the count memory delay relay CMD serves to isolate energy stored in any of the capacitors representative of a vehicle count which is about to energize a count memory relay at approximately the same time as releasing energy is being provided for another count memory relay further along the add release bus 201 or the subtract release bus 203. Under certain circumstances, to be subsequently discussed in detail, it has been found that whenever a count memory relay is picking up during the interim that releasing energy is being provided for a similar and more remote count memory relay, there is a possibility that the energy will be sufficient to release both count memory relays and therefore a vehicle count will be lost.

Whenever a count memory relay is energized in response to the passage of a vehicle out of or into the parking area, energy is supplied respectively to either the add count bus 200 or the subtract count bus 202 for energizing either the add bus indication relay ABI or the subtract bus indication relay SBI.

Incorporated in the normal counting circuits is a memory interlock relay MI which is energized in accordance with the presence of energy on either or both the add count bus 200 or the subtract count bus 202. The memory interlock relay MI serves as a means of detecting an actual vehicle count by the automatic counting circuits of the vehicle registering system and gives this vehicle count priority over any count which the operator of the parking area may be manually inserting into the system at that time.

The memory interlock relay MI also provides for the energization of the counter operate relay CO. The energized relay CO then completes a circuit for connecting the energy on the add count bus 200 which is evidenced by the energization of the relay ABI, or the energy on the subtract count bus 202 which is evidenced by the energization of the relay SBI, to either the counter add relay CA or the counter subtract relay CS. The counter operate relay CO also cooperates with the relay MI in its energized condition to complete a circuit which selectively applies energy to either the add release bus 201 or the subtract release bus 203 dependent upon which of the count relays CA or CS is being maintained in its energized condition.

When the vehicle count is removed from the count memory relay upon which it is stored, the energy representative of this vehicle count is removed from its respective count bus.

The relay CO is slow releasing as indicated by the shaded area at the base of the relay in order to allow the counter add or the counter subtract relay to be energized for the minimum "on" time needed by the totalizers to register the vehicle count on its display means. When the relay CO is deenergized it removes the energy to the counter add or counter subtract relay and also removes the energy from the release bus selected by the energization of either the counter add relay CA or the counter subtract relay CS.

The counter rest relay CR is energized in accordance with the energization of either the counter add relay CA or counter subtract relay CS and serves to deenergize the counter operate relay CO. The counter rest relay CR is made slow release in order to provide the minimum "off" time required by the totalizers. When the relay CR finally opens its contacts the circuit organization is ready to operate again.

Two totalizers are employed with the present embodiment of this invention. The available space totalizer 207 serves as a means for ascertaining the number of available spaces in the parking area. As a number of such totalizers are well-known to those familiar with the art, the internal mechanism of the totalizers has been represented by means of an add coil and a subtract coil which are respectively energized in accordance with the energization of the counter add relay CA or the counter subtract relay CS. When a vehicle is entering the parking area energy is provided by the relay CS to the subtract coil of the available space totalizer. The application of energy to the subtract coil causes the internal mechanism of the counter to move from a state of rest to a condition where it will cause one unit to be removed from the total number of available spaces appearing on the totalizer display means. This is the so-called "on" time of the counter mechanism and may be in the order of 100 milliseconds or more. When energy is removed from the relay CS the energizing circuit for the subtract coil is opened and the internal mechanism of the counter is restored to its normal rest condition. This is the so-called "off" time of the counter and is usually of the same duration as the "on" time of the totalizer. A similar sequence of events would occur if a vehicle were leaving the parking area and one unit representative of an available parking space was added to the total appearing on the totalizer display means by the energization and deenergization of the add coil in response to the energization and deenergization of the counter add relay CA.

A second totalizer for providing a cumulative count of all the vehicles entering the area is also illustrated in FIG. 4B. This cumulative totalizer 208 is provided should the operator of the parking area desire a means of ascertaining the number of vehicles which have entered the parking area during a given period of time. This totalizer has value in that it enables the operator of the parking area to determine the revenue derived from the parking area. The add coil of the cumulative totalizer 208 is therefore energized by a circuit which is completed and opened by the energization and deenergization of the counter subtract relay CS.

The circuit organization of this invention features a release coincidence circuit represented broadly by the release coincidence relay RC and the release coincidence repeater relay RCP. These relays and their associated circuitry function as a means of eliminating unnecessary operations of the available space totalizer 207 whenever a vehicle is leaving the parking area and a second vehicle is entering the parking area at approximately the same time and one of these vehicles is not being counted by the normal counting circuits of the system. Under these conditions release energy is immediately provided for both of the effected count memory relays and the time delay caused by the internal operations of the totalizer mechanism is eliminated thereby increasing the rate at which the system can register vehicle counts.

The release coincidence relay RC also energizes the totalizer 208 whenever dual vehicle passages in opposite directions occur. This is necessary because an accurate count of all vehicles entering the area is equal to the sum of all those entering vehicles which were registered on the available space totalizer 207 plus the number of vehicles which entered the area at or about the same time as a vehicle leaving the area which do not appear on the available space totalizer 207. The release coincidence relay RCP is provided to deenergize the release coincidence relay RC and relay RCP is made slow release for a time commensurate with the "off" time of the cumulative totalizer 208.

Also shown in FIG. 4B are two pushbuttons, namely, the counter add pushbutton and the counter subtract pushbutton. These pushbuttons are used for manually initiating operation of the counting circuits. As long as either the counter add pushbutton or the counter subtract pushbutton is depressed, vehicle counts will be respectively added to or subtracted from the total shown on the available space totalizer 207. The circuit arrangement is such that depression of either of the pushbuttons energizes the pushbutton interlock relay PBI which in its turn provides energy for a circuit to the windings of the counter operate relay CO. The pushbutton interlock relay PBI in conjunction with the counter operate relay CO also develops auxiliary circuits to the counter add relay CA or the counter subtract relay CS. Energy for the operation of the counter add relay CA or the counter subtract relay CS is provided in accordance with which one of the two pushbuttons is depressed.

The memory interlock relay MI is provided with a contact in the energizing circuit of the relay PBI to insure that whenever the automatic counting circuits are operative in response to an actual vehicle passage the manually initiated counting circuits are rendered inoperative. As soon as the actual vehicle passage has been registered manual initiation of the counting circuits is again permissible.

The indication lamps S1, S2, S3 and S4 shown in FIG. 4B provide a visual indication of the number of vehicle counts being added to or subtracted from the available space totalizer 207. The lamps S1 and S2 are employed with the automatic counting circuits of the vehicle registering system and the lamps S3 and S4 are used with the manually initiated counting circuits of the system.

In order to insure that only the desired number of vehicle counts are being placed in the system during manual initiation of the counting circuits, an additional delay is incorporated between pulses of the lamps S3 or S4 by means of the resistor/capacitor circuit C5/R5. This circuit provides for a longer delay than is usual for the slow release of the counter rest relay CR when the counting circuits are manually initiated so that the number of vehicle counts being added to or subtracted from the totalizer 207 may be readily discernible to the operator.

It was previously stated that the count memory delay relay CMD shown in FIG. 4A is used to isolate any energy representing a vehicle count which might be stored in the capacitors C1, C2, C3 and C4 from the count memory relays whenever energy is placed on the add release bus 201 or the subtract release bus 203 to release another vehicle count on one of the add memory or subtract memory relays. As the add memory relays and subtract memory relays are cascaded along common release buses, it can be seen that whenever release energy is on a release bus to effect the release of a remote count memory relay, that should a more adjacent similar count memory relay pick up during that period, a portion of the releasing energy may be diverted to the nearer count memory relay. It is possible under these circumstances that the division of the releasing energy caused by the pick up of the nearer similar count memory relay will occur at a point where the energy is sufficient to release both count memory relays and therefore a vehicle count will be lost.

In order to prevent this situation from occurring the present invention provides that whenever the memory interlock relay MI and the counter operate relay CO are energized in response to the normal counting circuits or whenever the release coincidence relay RC is energized in response to contemporaneous entering and exiting vehicles, the count memory delay relay CMD will pick up and delay any further energization of the count memory relays until such time as the vehicle currently being counted is registered on the totalizers.

More specifically, referring to FIG. 2, let us now assume that a vehicle is passing into the parking area over the entering roadway 1N and the occupancy relay 1NO is energized in accordance with the detection of the vehicle by the detector 1ND. This will cause the relay 1NO to pick up its front contact 12 completing a circuit for storing energy representative of the vehicle passage on the capacitor C3 (FIG. 4A). As long as the vehicle is detected by the vehicle detector 1ND, a circuit will be completed for charging the capacitor through the resistor R3. When the vehicle enters the parking area to the extent that its presence is no longer detected by the vehicle detector 1ND, the relay 1NO is deenergized closing its back contact 12 and completing a circuit for energizing the subtract memory relay 1SM. This circuit includes the capacitor C3, back contact 12 of relay 1NO, back contact 17 of relay CMD, the diode D3, the windings of the relay 1SM, and (−).

Energization of the relay 1SM closes its front contact 29 thereby completing a stick circuit for the relay 1SM in which energy is supplied through back contact 31 of the subtract memory release relay 1SMR. Energy is also available at front contact 30 of relay 1SM but this energy is not effective for the energization of the relay 1SMR because of its open front contact 32. The closure of front contact 28 of relay 1SM provides a discharge path for the capacitor C3 through resistor R3.

Energization of the relay 1SM closes its front contact 34 thereby providing for the energization of the subtract bus indication relay SBI. This circuit is completed through (+), front contact 34 of relay 1SM, back contact 35 of relay 1SMR, the subtract count bus 202, the windings of relay SBI, and (−). When the relay SBI is energized it picks up its front contact 70 thereby providing an obvious energizing circuit for the memory interlock relay MI.

The energized memory interlock relay MI closes its front contact 96 completing a circuit for energizing the counter operate relay CO. This circuit includes (+), front contact 96 of relay MI, back contact 102 of relay CR, back contact 62 of relay ABI, back contact 122 of relay RC, back contact 131 of relay RCP, the windings of the counter operate relay CO and (−). Energization of the relay CO closes its front contact 115 thereby completing a stick circuit through front contact 96 of relay MI, and back contact 102 of the counter rest relay CR.

When the energized relay CO closes its front contact 110 a circuit is completed for energizing the relay CMD which includes (+), front contact 90 of relay MI, front contact 110 of relay CO, the windings of relay CMD and (−). The pick up of back contacts 15, 16, 17 and 18 of relay CMD prevents the energization of any of the count memory relays by energy currently stored on the capacitors C1, C2, C3 or C4.

The closure of front contact 111 of the energized relay CO completes a stick circuit for the relay MI through front contact 92 of that relay in order to prevent interruption of the release pulse.

Energization of the counter operate relay CO also closes its front contact 114 completing an energizing circuit for the windings of the counter subtract relay CS. This circuit provides energy through front contact 71 of the relay SBI, front contact 94 of the relay MI, front contact 114 of the counter operate relay CO, back contact 142 of the counter add relay CA and the windings of the relay CS to (—).

Energization of the relay CS closes its front contact 152 completing a stick circuit for the relay CS through front contact 113 of relay CO. This stick circuit insures that as long as the counter operate relay CO remains energized, energy will be maintained on the windings of the counter subtract relay CS. As the counter operate relay CO is made slow release for a period of time proportional to the "on" time of the available space totalizer 207, it can thus be seen that energy will be provided to the subtract coil of the totalizer 207 through front contact 154 of the relay CS, for a period of time sufficient to insure the registration of the vehicle count on the totalizer 207.

Energization of the relay CS opens back contact 151 preventing the energization of the relay CA while a subtract vehicle count is in progress.

Energization of the relay CS also closes its front contact 155 completing a circuit for energizing the add coil of the cumulative totalizer 208. Energy is provided for the add coil by a circuit completed through front contact 97 of relay MI and front contact 155 of relay CS, the add coil of the cumulative totalizer 208 and (—).

Energization of the relay CS closes its front contact 156 energizing the indication lamp S1 through a circuit including back contact 85 of the relay PBI. The lamp S1 provides a visual indication of the registration of a vehicle entering the parking area.

The closure of front contact 157 of relay CS completes a circuit for placing the release energy on the subtract release bus 203. This circuit includes (+), front contact 98 of relay MI, front contact 117 of relay CO, front contact 157 of relay CS, back contact 49 of relay 2SM, front contact 33 of relay 1SM, diode D10, the windings of the count memory release relay 1SMR and (—). When the relay 1SMR becomes energized it closes its front contact 32 completing its own stick circuit. This circuit includes (+), front contact 30 of relay 1SM and front contact 32 of the relay 1SMR.

The energized relay 1SMR also opens its front contact 31 removing one source of energy from the windings of the relay 1SM. However, the relay 1SM remains in its energized condition because the energy on the subtract release bus 203 is simultaneously being applied to its winding through the diode D6 and the blocking effect of the diode D3.

Energization of the relay CS also closes its front contact 153 completing an obvious circuit for the energization of the counter release relay CR. This energy will be applied solely to the relay CR and will not be stored in the capacitor C5 because of the open front contact 95 of the energized memory interlock relay MI.

The enerization of the relay CR closes its front contact 101 thereby completing a stick circuit for placing energy on the windings of relay MI through front contact 92 of relay MI. Energization of the relay CR also opens its back contact 102 thereby removing the energy being applied to the windings of the counter operate relay CO.

Due to the slow release characteristics of the counter operate relay CO it does not open its contacts immediately but maintains energy on the windings of the counter subtract relay CS through circuits completed by its front contacts 113 and 114. This is to enable the relay CS to maintain energy on the subtract coil of the available space totalizer 207 through its front contact 154 for a period of time sufficient to allow the internal mechanism of the totalizer to remove one digit representative of an entering vehicle from the total appearing thereon. When the relay CO finally opens its front contact 113 and its front contact 114, the counter subtract relay CS becomes deenergized opening its front contact 154 removing the energy placed on the subtract coil of the available space totalizer 207 and the internal mechanism of the totalizer begins to restore itself to the rest position.

When front contact 155 of the relay CS is opened, energy is removed from the add coil of the totalizer 208 and this totalizer begins to restore itself to its rest position. The opening of front contact 156 of the relay CS deenergizes the indication lamp S1.

When front contact 117 of the relay CO opens, it removes the energy on the subtract release bus 203 causing the subtract memory relay 1SM to drop away. The deenergization of the subtract memory relay 1SM opens its front contact 30 removing the energy applied to the windings of the memory release relay 1SMR through front contact 32 of that relay. The closure of back contact 33 of relay 1SM restores the count memory circuits to their original condition and they are again ready to store a vehicle count representative of a vehicle entering the parking area over the roadway 1N.

When front contact 110 of relay CO drops away, it open circuits the energy being applied to windings of the count memory delay relay CMD through front contact 90 of relay MI. The deenergization to relay CMD closes its back contacts 15, 16, 17 and 18 again permitting any energy which might be stored in the capacitors C1, C2, C3 or C4 to be applied to their respective count memory relays.

When the counter subtract relay CS was open circuited by the deenergization of the counter operate relay CO, this caused the opening of its front contact 153 removing the energy being applied to the windings of the counter rest relay CR through front contact 153 of the relay CS. The deenergization of the relay CR opens its front contact 101 removing the energy being applied through an obvious stick circuit to the windings of the relay MI causing that relay to become deenergized.

The deenergization of relay CR also effects the closure of its back contact 102 restoring the energizing circuits for the counter operate relay CO to their normal condition. The counter rest relay CR is made slow release in order to insure the proper "off" time for the internal mechanism of the available space totalizer 207. That is to say, that as long as its front contact 102 remains picked up the counter operate relay CO cannot be energized to begin a counting cycle. The slow releasing of relay CR therefore prevents the energization of the counter operate relay CO until the internal mechanism of the available space totalizer 207 is restored to its normal rest condition and is again in position to add or subtract a digit from the total appearing on the totalizer.

When the counter rest relay CR finally drops away the vehicle registration cycle is completed and the circuit organization is in a position to register a new vehicle count.

The circuitry and apparatus for registration of an exiting vehicle is similar to that discussed for a vehicle entering the parking area in that should the detector 1XD (FIG. 2) detect the presence of a vehicle leaving the parking area over the passageway 1X, it will cause the energization of the occupancy relay 1XO. The pick up of front contact 11 of the energized relay 1XO will cause a charge to be placed on the capacitor C4 which will be representative of the vehicle passing beneath the detector 1XD. When the vehicle passes out of the detection area of the detector 1XD, relay 1XO becomes deenergized closing its back contact 11 thereby allowing the charge stored on the capacitor C4 to discharge through the windings of the add memory relay 1AM causing this relay to become energized. Relay 1AM is thereafter held up through a stick circuit which includes (+), back contact 27 of the relay 1AMR, front contact 21 of the relay 1AM, the windings of the relay 1AM and (−). The diodes D4 and D5 function as a blocking means to insure that the energy supplied by the aforementioned circuit is applied solely to the windings of the relay 1AM.

When the energized relay 1AM closes its front contact 10, the remainder of the charge stored on the capacitor C4 is then discharged through the resistor R9.

Energization of the relay 1AM closes its front contact 24 applying energy to the add count bus 200 through a circuit including (+), front contact 24 of relay 1AM and back contact 25 of relay 1AMR resulting in the energization of the add bus indication relay ABI.

The energization of the relay ABI closes its front contact 60 energizing the memory interlock relay MI which in opening its back contact 91 renders the manually initiated counting circuits inoperative by open circuiting the windings of the pushbutton interlock relay PBI.

When the energized relay MI closes its front contact 96 energy is applied to the windings of the counter operate relay CO through a circuit including (+), front contact 96 of relay MI, back contact 102 of relay CR, back contact 72 of relay SBI, back contact 122 of relay RC, back contact 131 of relay RCP, the windings of the relay CO and (−). When the relay CO picks up its front contact 115 a stick circuit for that relay is completed through (+), front contact 96 of relay MI, back contact 102 of relay CR, front contact 115 of relay CO, the windings of relay CO and (−).

The closure of front contact 110 of the relay CO completes a circuit for energizing the count memory delay relay CMD. This circuit is completed from (+), front contact 90 of relay MI, front contact 110 of relay CO, the windings of the relay CMD and (−). The opening of back contacts 15, 16, 17 and 18 of relay CMD isolates any vehicle count which may be stored on the capacitors C1, C2, C3 or C4 from the count memory relays. As previously noted, this is to insure that when the counting operation and its consequent releasing operation places energy on the add release bus 201, the second add count memory relay 2AM will not be picked up by the presence of another vehicle leaving the parking area shortly after the departure of the vehicle presently being counted over the passageway 1X. If the count memory delay function was eliminated, the energy being on the add release bus count 201 could cause the release of both the add count memory relay 1AM and simultaneously the release of the add count memory relay 2AM by providing for the energization of both the add memory release relays 1AMR and 2AMR.

The closure of front contact 111 of relay CO provides energy for maintaining a stick circuit for the relay MI through front contact 111 of relay CO and front contact 92 of relay MI.

When front contact 112 of relay CO closes it provides an energizing circuit for the counter add relay CA. This circuit includes (+), front contact 61 of relay ABI, front contact 93 of relay MI, front contact 112 of relay CO, back contact 151 of relay CS, the windings of the relay CA and (−). A stick circuit is developed for maintaining energy on the windings of the relay CA through front contact 113 of relay CO and front contact 141 of relay CA.

The energization of the relay CA completes a circuit for energizing the add coil of the available space totalizer 207 through front contact 144 of relay CA. The closure of front contact 145 of relay CA completes a circuit through back contact 85 of relay PBI for energizing the lamp S2 and providing a visual indication of the fact that the registration of an exiting vehicle is taking place.

The closure of front contact 146 of the relay CA completes a circuit for energizing the add memory release relay 1AMR. This circuit includes (+), front contact 98 of relay MI, front contact 117 of relay CO, front contact 146 of relay CA, the add release bus 201, back contact 41 of relay 2AM, front contact 23 of relay 1AM, diode D9, the windings of relay 1AMR and (−). When the energized relay 1AMR opens its back contact 27, it removes one source of energy from the windings of the relay 1AM. However, relay 1AM remains energized due to the energy on the add release bus 201 and as long as relay 1AM is energized it will provide energy through its front contact 22 for the obvious stick circuit to the windings of relay 1AMR. It can thus be seen that both relays 1AM and 1AMR will remain energized as long as energy is maintained on the add release bus 201.

When the energized counter add relay CA closes its front contact 143 it completes an obvious energizing circuit for the counter rest relay CR. The relay CR then closes its front contact 101 completing a second stick circuit for the relay MI through front contact 92 of that relay.

The pick up of front contact 102 of the relay CR opens the circuit which is providing energy for the windings of the counter operate relay CO through front contact 96 of relay MI. As was previously mentioned, the relay CO is made slow release for a period of time sufficient to insure the proper "on" time for the available space totalizer 207. When the relay CO finally opens its contacts 112 and 113 energy is removed from the windings of the counter add relay CA causing that relay to open its front contact 144 thereby removing the energy placed on the add coil of the totalizer 207 and permitting the internal mechanism of the totalizer 207 to return to its normal rest position. The successive energization and deenergization of the add coil of the totalizer 207 adds one digit to the total appearing thereon which is representative of the additional parking space now available due to the passage of a vehicle from the parking area.

The relay CO also opens its front contact 117 removing the energy on the add release bus 201 which is energizing the add memory relay 1AM and the add memory release relay 1AMR. The deenergization of the relay 1AM opens its front contact 22 which causes the stick circuit energizing relay 1AMR to open, removing the energy from the windings of that relay. The deenergization of relays 1AM and 1AMR restores their contacts to the normal position as shown in FIG. 4A.

When front contact 110 of the deenergized relay CO opens, energy is removed from the windings of the count memory delay relay CMD. The relay CMD again closes its back contacts 15, 16, 17 and 18 thereby allowing any vehicle count stored on the capacitors C1, C2, C3 or C4 to energize its respective count memory relay and thus begin a new counting cycle.

Deenergization of the relay CA also opens its front contact 145 removing the energy placed on the indication lamp S2. This pulsing of the indication lamp S2 provides a visual indication that one digit had been added to the totalizer 207, in response to the exiting vehicle.

When front contact 143 of relay CA is opened, it opens the energizing circuit for the windings of the counter rest relay CR. Deenergization of this relay opens its front contact 101 and now the relay MI is permitted to drop away only provided that there is not an additional vehicle count currently being stored on the add bus indication relay ABI or the subtract bus indication relay SBI.

When relay CR finally closes its back contact 102 the counting circuits are now restored to their original condition as shown in FIGS. 4A and 4B and they are again ready to actuate the totalizers in response to vehicle passage into or out of the parking area.

The release coincidence feature of this invention is rendered operative whenever a traffic pattern occurs in which a first vehicle is entering the parking area and a second vehicle is leaving the parking area at approximately the same time and the counting circuits are not in the process of registering a count representative of one of these vehicles.

In view of the prior descriptive material concerning the operation of the counting circuits whenever an individual vehicle is entering or leaving the parking area, it should be sufficient to state that the simultaneous passage of two vehicles in opposite directions through two of the detection areas will cause the simultaneous energization of the add bus indication relay ABI and the subtract bus indication relay SBI. That is to say, should an entering vehicle be detected by the detector 1ND it will cause the energization of the 1N roadway occupancy relay 1NO. When this relay is deenergized by the passage of the vehicle out of the 1ND detection area it will cause the capacitor C3 to energize the subtract memory relay 1SM in the same manner as previously discussed. The closure of front contact 34 of relay 1SM will place energy on the subtract count bus 202 which will energize the subtract bus indication relay SBI.

In like manner, a vehicle exiting over the passageway 1X will be detected by the detector 1XD causing the 1X passageway occupancy relay 1XO to become energized. When the vehicle is no longer detected by the detector 1XD, the relay 1XO will become deenergized and the vehicle count stored in the capacitor C4 will energize the add memory relay 1AM. The closure of front contact 24 of relay 1AM will place energy on the add count bus 200 which will energize the add bus indication relay ABI.

The energization of the relays ABI and SBI causes the pick up of their respective front contacts 60 and 70 which complete obvious circuits for providing energy to the windings of the relay MI.

The pick up of front contact 63 of relay ABI and front contact 73 of relay SBI completes an energizing circuit for the release coincidence relay RC. This circuit includes (+), front contact 63 of relay ABI, front contact 73 of relay SBI, back contact 103 of relay CR, back contact 116 of relay CO, back contact 132 of the release coincidence repeater relay RCP, the windings of relay RC and (—). Back contacts 103 of the relay CR and 116 of the relay CO are placed in the energizing circuit for the release coincidence relay RC to insure that the normal counting circuits are not counting either the entering or the exiting vehicle.

The closure of front contact 120 of relay RC completes an obvious circuit for energizing the count memory delay relay CMD. This causes the pick up of its back contacts 15, 16, 17 and 18 preventing any vehicle counts stored on the capacitors C1, C2, C3 and C4 from energizing the count memory relays during the time that energy is placed on either or both the add release bus 201 and the subtract release bus 203.

At the same time that front contact 120 of relay RC causes the energization of the relay CMD, the relay RC also closes its front contacts 125 and 126 respectively to the add release bus 201 and the subtract release bus 203. Therefore, when the relay CMD closes its front contacts 19 and 20 energizing circuits are completed for releasing the vehicle counts stored on the add memory relay 1AM and the subtract memory relay 1SM.

The circuit for the add memory release relay 1AMR includes (+), front contact 19 of relay CMD, front contact 125 of relay RC, the add release bus 201, front contact 23 of relay 1AM, the windings of relay 1AMR and (—). The relay 1AMR is maintained in its energized condition by a stick circuit which includes (+), front contact 27 removing one source of energy from the relay 1AMR. The energization of relay 1AMR opens its back contact 27 removing one source of energy from the relay 1AM. However, the relay 1AM will be maintained in its energized condition by the energy now on the add release bus 201 and the blocking effect of the diodes D4 and D5.

Energization of the subtract memory release relay 1SMR takes place by means of a circuit which includes (+), front contact 20 of relay CMD, front contact 126 of relay RC, the subtract release bus 203, front contact 33 of relay 1SM, diode D10, the windings of relay 1SMR and (—). The pick up of front contact 32 of relay 1SMR completes a stick circuit for this relay which includes front contact 30 of relay 1SM. The opening of front contact 31 of relay 1SMR removes one source of energy from the relay 1SM but this relay will remain energized due to the energy being provided from the subtract release bus 203 and the blocking effect of the diodes D3 and D6.

The closure of front contact 123 of relay RC completes an obvious circuit for energizing the add coil of the cumulative totalizer 208. When relay RC closes its front contact 124 it completes an obvious energizing circuit for the release coincidence repeater relay RCP which in opening its back contact 132 removes energy from the release coincidence relay RC.

The relay RC is made slow release in order to time the release energy pulses to the release buses and the counting pulses to the cumulative totalizer 208. When the relay RC finally drops away it opens its front contacts 125 and 126 removing the energy placed respectively on the add release bus 201 and the subtract release bus 203, causing add memory relay 1AM and subtract memory relay 1SM to become deenergized. The add memory relay 1AM opens its front contact 22 removing the remaining source of energy from the windings of the relay 1SMR causing that relay to drop away. Removal of the energy from the windings of the relay 1SM opens its front contact 30 which in like manner causes the relay 1SMR to become deenergized. These memory relay circuits are now restored to their normal condition shown in FIG. 4A.

The opening of front contact 120 of relay RC removes the energy from the windings of relay CMD causing that relay to again close its back contacts 15, 16, 17 and 18 and to open its front contacts 19 and 20.

The opening of front contact 123 of relay RC removes the energy which has been placed on the add coil of the cumulative totalizer 208 and the internal mechanism of the totalizer begins to restore itself to its normal at rest position.

When front contact 124 of relay RC is opened the relay RCP becomes deenergized. The release coincidence repeater relay RCP is slow released to cover the "off" time required by the cumulative totalizer. That is to say, the time required by the cumulative totalizer 208 to be restored to its normal at rest position and again be ready to register a vehicle count representative of an entering vehicle. When the release coincidence repeater relay RCP finally closes its back contacts 131 and 132 both the release coincidence circuits and the normal automatic counting circuits are again prepared to operate depending on the nature of the vehicle count information stored in the count memory relays.

It can therefore be seen from the foregoing description that the release coincidence relay RC is energized when the circuit senses opposite vehicle counts on the count buses and checks that the regular counting circuit is not already counting one of these. The circuit then releases these coincidental opposing vehicle counts without requiring the available space totalizer 207 to make its time consuming moves. It can also be seen that when a cumulative count of one type of input, e.g. entering vehicles, is required that it can be derived by adding the subtract counts of the regular counting system and the releases of the release coincidence circuit. The overall effect under these conditions is that with simultaneous opposite vehicle counts being released, the system is ready for additional vehicle counts in approximately half the time that would be required without the release coincidence circuit.

The pushbutton interlock circuit is provided in the event that it is desired to manually initiate a change in the total displayed on the available space totalizer 207. In order to remove a fixed number of digits from the totalizer 207 the counter subtract pushbutton in FIG. 4B is depressed. This causes front contact 170, which is mechanically connected to the counter subtract pushbutton, to provide a circuit for energizing the pushbutton interlock relay PBI. This circuit includes (+), front contact 170 of the counter subtract pushbutton, back contact 130 of relay RCP, back contact 121 of relay RC, back contact 100 of relay CR, back contact 91 of relay MI, the windings of relay PBI, and (−). The aforementioned back contacts are inserted in the energization circuit for the relay PBI in order to prevent the energization of that relay whenever the normal counting circuit or the release coincidence circuits are operative.

Energization of the relay PBI closes its front contact 84 thereby completing an energizing circuit for the counter operate relay CO. This circuit includes (+), front contact 84 of relay PBI, back contact 102 of relay CR, back contact 62 of relay ABI, and back contact 72 of relay SBI in parallel arrangement, back contact 122 of relay RC, back contact 131 of relay RCP, the windings of relay CO, and (−). Energization of the relay CO closes its front contact 115 thereby completing a stick circuit for that relay from (+), front contact 84 of relay PBI, back contact 102 of relay CR, front contact 115 of relay CO, the windings of relay CO, and (−).

When the relay CO becomes energized it closes its front contact 114 completing an auxiliary circuit for energizing the counter subtract relay CS. This circuit includes (+), front contact 171 of the counter subtract pushbutton, front contact 83 of the energized relay PBI, front contact 114 of relay CO, back contact 142 of relay CA, the windings of relay CS, and (−).

The closure of front contact 152 of relay CS completes a stick circuit providing energy to the windings of relay CS through front contact 113 of relay CO. When back contact 151 of energized relay CS opens it insures against the simultaneous energization of relay CA as long as relay CS is energized. The closure of front contact 150 of relay CS completes an obvious stick circuit for relay PBI through front contact 80 of that relay.

Energization of the relay CS also closes its front contact 154 thereby providing energy for the subtract coil of the available space totalizer 207 through an obvious circuit. A visual indication of the subtract vehicle count in progress is provided by the indication lamp S4. The energizing circuit for the lamp S4 is from (+), front contact 85 of relay PBI, front contact 172 of the counter subtract pushbutton, the lamp S4, and (−).

Energization of the relay CS also closes its front contact 153 which completes an obvious circuit for energizing the counter rest relay CR. This same source of energy is simultaneously applied to the capacitor C5 through the resistor R5 and a back contact 95 of the relay MI. A more detailed explanation of the function of the R5/C5 circuit will subsequently be given but it is sufficient to say at this time that it is provided in order to maintain a slower release for the relay CR when the pushbutton interlock circuit is being used in order that a longer period of "off" time may be provided between each pulse of the lamp S4 so that each subtract vehicle count being manually initiated may be readily distinguishable to the eye of the operator. This circuit is not effective when the normal counting cycle is in progress and the relay MI is energized picking up its back contact 95.

The energized counter rest relay CR opens its back contact 100 removing the source of positive potential being applied to the windings of relay PBI through front contact 170 of the counter subtract pushbutton.

Energization of the counter rest relay CR also picks up its back contact 102 removing the energy from the windings of the counter operate relay CO. The opening of front contacts 113 and 114 of the relay CO causes relay CS to become deenergized. This opens front contact 154 of the relay CS removing energy from the subtract coil of the totalizer 207 and the internal mechanism of the totalizer begins to restore itself to its normal rest position.

The cumulative totalizer 208 is not effected by the opening and closing of contact 155 of relay CS because relay MI is deenergized. The total appearing on the totalizer 208 reflects only the actual vehicle count of all vehicles entering the parking area and is not actuated in response to pushbutton initiation of the counting circuits.

The deenergization of relay CS also opens its front contact 150 removing the source of positive potential being applied through that contact to the windings of relay PBI via front contact 80 of relay PBI. This causes the closure of back contact 85 of relay PBI removing the energy being applied through that contact to the indication lamp S4.

The opening of front contact 153 of relay CS removes one source of positive potential from the windings of relay CR but this relay remains energized for a period of time in excess of its normal slow release period by the energy stored in the capacitor C5 which now discharges through the windings of the relay CR through the resistor R5 and back contact 95 of relay MI. This will prevent the reenergization of the lamp S4 for a period of time in excess of its normal operating time which is commensurate with the values selected for R5 and C5. This is the case because the relay PBI cannot be energized as long as back contact 100 of relay CR remains opened. When the relay CR finally drops away it closes front contact 100 again completing a circuit for energizing relay PBI through front contact 170 of the counter subtract pushbutton. Thus it can be seen that as long as the counter subtract pushbutton remains depressed successive vehicle counts will be removed from the available space totalizer 207 for as soon as back contact 100 of relay CR closes, the pushbutton interlock circuits are restored to their original condition and are ready to begin another manually initiated vehicle count. The counter add pushbutton operates in a similar manner to add successive vehicle counts to the add coil of the available space totalizer 207 as long as said counter add pushbutton is depressed.

The pushbutton interlock circuit is designed so as not to interrupt the operation of the automatic counting circuits of the vehicle registration system when such circuits are operative in response to actual traffic movements into or out of the parking area.

From our prior description it has been shown that vehicle counts representing actual vehicle movements places energy on either or both the add count bus 200 or the subtract count bus 202 resulting in the energization respectively of the add bus indication relay ABI and/or subtract bus indication relay SBI. Whenever either of these relays are energized they in turn energize the memory interlock relay MI. This would open back contact 91 of the memory interlock relay MI which will open circuit the energizing potential for the windings of relay PBI which is being applied through front contact 170 of the counter subtract pushbutton or front contact 160 of the counter add pushbutton.

Moreover, should the relay ABI and SBI be energized simultaneously, it will cause the operation of the release coincidence circuit. During the time a release coincidence cycle is in progress, it is required that either back contact 121 of relay RC or back contact 130 of relay RCP be opened and this will again prevent the energization of the relay PBI. When the normal counting circuits or the release coincidence circuits have been restored to their at-rest condition, the relay PBI may be again energized and manually initiated vehicle counts selectively placed on the totalizer 207 in accordance with whether the counter add pushbutton or the counter subtract pushbutton is depressed.

Operation of the count memory delay circuit may be best described in terms of a traffic pattern whereby successive vehicles are entering or leaving the parking area at approximately the same time. Therefore, let us assume that a vehicle entering the parking area over the roadway 1N has passed through the detection area monitored by the vehicle detector 1ND and caused the successive energization and deenergization of the roadway occupancy relay 1NO. Under these circumstances the energy stored in the capacitor C3 representing this subtract vehicle count will energize the subtract memory relay 1SM as previously described.

The energization of relay 1SM picks up its contact 34 completing a circuit for providing energizing potential to the windings of the subtract bus indication relay SBI. This circuit includes (+), front contact 34 of relay 1SM, back contact 35 of relay 1SMR, the subtract count bus 202, the windings of relay SBI and (−). The relay SBI then completes an obvious energizing circuit for the memory interlock relay MI which then energizes the counter operate relay CO by means of the energizing potential provided through front contact 96 of relay MI. The energization of relays MI and CO completes an energizing circuit for the count memory delay relay CMD through their respective front contacts 90 and 110. The relay CMD in picking up its back contacts 15, 16, 17 and 18 prevent any vehicle count stored on the capacitors C1, C2, C3 and C4 from energizing the count memory relays.

This is a critical point in the circuit operation of the vehicle registration system because at the same time the closure of front contact 110 of relay CO completes the energizing circuit for relay CMD, front contact 114 of relay CO completes an energizing circuit for the counter subtract relay CS. When the relay CS closes its front contact 157 energy for releasing the subtract memory relay 1SM is provided on the subtract release bus 203 through a circuit including (+), front contact 98 of relay MI, front contact 117 of relay CO and front contact 157 of relay CS.

Under these circumstances, if another subtract vehicle count representative of a vehicle passing into the parking area over roadway 2N was permitted to energize the other subtract memory relay 2SM, then this relay in closing its front contact 49 would divert a portion of the energy on the subtract release bus 203 to the windings of its memory release relay 2SMR and when this energy was removed from the subtract release bus 203 by the opening of front contact 117 of relay CO both the subtract memory relays 1SM and 2SM would become deenergized and a vehicle count would be lost.

However, with the count memory delay feature, this situation is avoided for just prior to the time that energy is placed on the subtract release bus 203 due to the closure of front contact 157 of the counter subtract relay CS, the count memory delay relay CMD is energized and prevents the energization of any of the other count memory relays.

From the above it can be seen that the count memory delay circuit of the vehicle registration system prevents the energization of the count memory relays during the time that releasing energy is on either of the release buses. This problem becomes more acute as the number of count memory relays connected to a common release bus is increased and release energy is being provided for a remote count memory relay during the time a more adjacent count memory relay is picked up.

The same considerations apply whenever two vehicles are exiting from the parking area and their times of departure are such that release energy is being provided for the vehicle count representative of the first leaving vehicle while the second leaving vehicle count is energizing a more adjacent count memory relay.

The count memory delay feature is also operative whenever a release coincidence cycle is in progress. In this instance, the opposing vehicle counts simultaneously energize the indication relays ABI and SBI. The release coincidence relay RC is then energized by a circuit completed through front contact 63 of relay ABI and front contact 73 of relay SBI. The energization of relay RC closes its front contact 120 completing an obvious circuit for the energization of the count memory delay relay CMD. The energized relay RC simultaneously closes both its front contacts 125 and 126 which are respectively connected to the add release bus 201 and the subtract release bus 203. Therefore, when the count memory delay relay CMD picks up its back contact 15, 16, 17 and 18 preventing the energization of the count memory relays by any vehicle count which might be stored on the capacitors C1, C2, C3 and C4, it also closes its front contact 19 and 20 providing energy for both of the release buses.

The relay RC also completes an obvious energizing circuit for the relay RCP which in opening its back contact 132 removes the energy being applied to the relay RC. When the relay RC drops away its front contact 125 and 126 the energy is removed from the release buses and the opposing vehicle counts are released from the count memory relays. The opening of front contact 120 of RC deenergizes the relay CMD restoring the count memory circuits to their normal condition as shown in FIG. 4A.

Thus it can be seen that a vehicle count representative of another entering vehicle or leaving vehicle is prevented from picking up one of the other count memory relays while the releasing energy for the opposing vehicle counts is removing these counts from the count memory relays upon which they have been stored.

Having described an improved vehicle registering system for accurately and rapidly counting vehicles in accordance with their direction of travel through predetermined detection area as one specific embodiment of this invention, I desire it to be understood that various modifications, adaptations and alterations may be made to the specific form of this invention illustrated in the drawings and described herein without departing from the spirit or scope of this invention.

What I claim is:

1. In a system for registering the number of vehicles separately detected by each of a plurality of vehicle detectors the combination comprising, a first storage means for each said detector being operable from a normal condition to a distinctive storage condition upon the detection of a vehicle by the respective vehicle detector, a second storage means for each said vehicle detector and also being operable from a normal condition to a distinctive storage condition in response to the corresponding first storage means being in said distinctive storage condition, means for at times electrically coupling each said second storage means to the respective first storage means, digital counting means, means responsive to any said second storage means being in said distinctive condition for operating said counting means to the next digit and for concurrently also restoring one of said second storage means to its normal condition, and means controlled by said responsive means and acting on said coupling means to electrically uncouple each said second storage means from its associated first storage means throughout the time the responsive means is restoring said one of said storage means.

2. The system of claim 1 wherein each said first storage means comprises a capacitor which is charged when the associated vehicle detector detects a vehicle, each said second storage means comprises an electromagnetic relay, and said coupling means includes at least one contact which is normally closed to complete a discharge circuit for each capacitor to the winding of the associated relay.

3. The invention as defined in claim 2 which further includes means governed by the actuation of the relay in response to the charge applied thereto from the associated capacitor substantially fully discharges said capacitor.

4. In a system for counting the number of vehicles within a confined area having plural entrance and exit passageways, at least one vehicle detector at each said passageway being at least momentarily operated to a distinctive condition in response to the passage of a vehicle, a first plurality of storage means operatively coupled to the vehicle detectors for the entrance passageways and a second plurality of storage means operatively coupled to the vehicle detectors for the exit passageways, each vehicle detector when operated to its said distinctive condition operating an associated storage unit from a normal condition to a storage condition, totalizer circuit means having separate "add" and "subtract" input terminals, means coupling each plurality of storage units to said totalizer and being governed by each of said first plurality of storage means which is in its said storage condition for applying an operating input to one of said totalizer input terminals to thereby operate said totalizer one step in a selected direction and governed by each of said second plurality of storage means which is in its said storage condition for applying an operating input to the other of said totalizer input terminals to thereby operate said totalizer one step in the opposite direction, said coupling means restoring to its normal condition any storage means which has produced an actuation of said totalizer, and means operable when concurrently a storage unit in each of said first and second plurality of storage means is in its storage condition for preventing the application of an operating input to either input terminal of said totalizer and for restoring both such storage means to their normal conditions, whereby the concurrent entrance of a vehicle with the exit of a vehicle produces no actuations of said totalizer so as to leave said totalizer free to count other vehicles entering or leaving through said passageways.

5. In a system for registering the number of vehicles entering into and exiting from a parking area having at least one entrance passageway and at least one exit passageway, the combination comprising, vehicle detection means for each passageway producing an output signal upon the passage of a vehicle through the respective passageway, first and second storage means each registering the number of output signals produced by the plurality of vehicle detector means associated respectively with the entrance and exit passageways, an add-subtract counter having at least two input terminals and operating a single step in one counting direction upon the application of a control manifestation to one of its input terminals and operating a single step in the opposite counting direction upon the application of a control manifestation to the other of its input terminals, means responsive to the registration by said first storage means of one of said output signals for applying a conrol manifestation to said one terminal of said counting means and being responsive to the registration by said second storage means of one of said output signals for applying a control manifestation to said other of said terminals, means operable upon the operation of said counter by a single step to remove a single count from whichever of said storage means provided the last operation of said counter, said responsive means being also responsive to the concurrent registration by both said storage means of at least one count for removing from both said storage means a single count registered thereon without operating said counter.

6. In a system for cumulatively registering randomly occurring "add" and "subtract" counts respectively derived from independent first and second count sources, the combination comprising, a first and second plurality of storage units respectively associated with said first and second count sources, means operatively connecting each said count source to its respective plurality of storage units and operating one associated storage unit in said respective plurality from its normal condition to a distinctive storage condition in response to each occurrence of a count from the associated count source, totalizer means having separate "add" and "subtract" input circuits, means coupling each plurality of storage means to said totalizer and governed by each of said first plurality of storage units which is in its said distinctive storage condition for applying an operating input to one of said totalizer input circuits to thereby add one count to said totalizer and governed by each of said second plurality of storage units which is in its said distinctive storage condition for applying an operating input to the other of said totalizer input circuits to thereby subtract one count from said totalizer, said coupling means restoring to its normal condition any storage unit which has produced an operation of said totalizer, and means operable when concurrently a storage unit in each of said first and second plurality of storage units is in its distinctive storage condition for preventing the application of an operating input to either input terminal of said totalizer and for restoring both such concurrent storage units to their normal conditions, whereby the concurrence of counts from said first and second count sources produces no actuations of said totalizer.

References Cited by the Examiner
UNITED STATES PATENTS

| | | | |
|---|---|---|---|
| 1,245,665 | 11/17 | Bohan | 235—92 |
| 1,335,596 | 3/20 | Morison. | |
| 1,917,679 | 7/33 | Wiberg | 235—92 |
| 2,482,610 | 9/49 | Burn | 340—51 X |
| 2,644,150 | 6/52 | Burn | 235—98 X |
| 3,081,941 | 3/63 | Hiliker | 235—99 |
| 3,105,221 | 9/63 | Schwarz | 340—51 |

LEO SMILOW, *Primary Examiner.*

ABRAHAM BERLIN, *Examiner.*